(12) United States Patent
Qian et al.

(10) Patent No.: US 10,128,891 B2
(45) Date of Patent: Nov. 13, 2018

(54) MOBILE PHONE / TABLET SHELL WITH FINGER GRASPING RING

(71) Applicants: Davy Zide Qian, Arcacia, CA (US); Benyu Qian, Shanghai (CN); Lequn Lu, Shanghai (CN)

(72) Inventors: Davy Zide Qian, Arcacia, CA (US); Benyu Qian, Shanghai (CN); Lequn Lu, Shanghai (CN)

( * ) Notice: Subject to any disclaimer, the term of this patent is extended or adjusted under 35 U.S.C. 154(b) by 0 days.

(21) Appl. No.: 15/447,444

(22) Filed: Mar. 2, 2017

(65) Prior Publication Data

US 2017/0201286 A1    Jul. 13, 2017

Related U.S. Application Data

(63) Continuation-in-part of application No. 15/014,832, filed on Feb. 3, 2016, now abandoned.

(60) Provisional application No. 62/303,763, filed on Mar. 4, 2016, provisional application No. 62/112,204, filed on Feb. 5, 2015, provisional application No. 62/182,514, filed on Jun. 20, 2015, provisional application No. 62/274,313, filed on Jan. 3, 2016, provisional application No. 62/275,255, filed on Jan. 6, 2016.

(51) Int. Cl.
*H04M 1/00* (2006.01)
*H04B 1/3888* (2015.01)

(52) U.S. Cl.
CPC ................. *H04B 1/3888* (2013.01)

(58) Field of Classification Search
CPC .................................................... H04B 1/3888
USPC ........................................... 455/575.1, 575.8
See application file for complete search history.

(56) References Cited

U.S. PATENT DOCUMENTS

| | | | |
|---|---|---|---|
| 2011/0240830 A1* | 10/2011 | Alemozafar | F16M 13/00 248/689 |
| 2012/0048873 A1* | 3/2012 | Hyseni | A45F 5/00 220/752 |
| 2013/0219584 A1* | 8/2013 | Atwood | G06F 1/1613 2/160 |
| 2015/0245519 A1* | 8/2015 | Forristall | H02J 7/0054 320/103 |
| 2016/0049983 A1* | 2/2016 | Ripka | H04B 1/385 455/575.6 |

* cited by examiner

*Primary Examiner* — Raj Chakraborty
(74) *Attorney, Agent, or Firm* — Global IP Services; Tianhua Gu

(57) ABSTRACT

A mobile phone/tablet case with finger grasping ring comprises a box for receiving a body of the mobile phone or tablet, a finger grasping ring is provided on the box bottom; the finger grasping ring is provided a multiple of finger holes which are enterable by fingers. Another embodiment the finger grasping ring has an elastic valve and an elastic belt; the elastic valve has one side connected with the elastic bottom together and other sides are separated from the bottom; the elastic belt has two opposite ends connected with the elastic valve together and other two opposite sides separated from the elastic valve, the elastic belt is parallel to long sides of the box. When the middle finger of user enter the gap between the belt and valve, the case with a mobile phone/tablet is grasped without thumb.

2 Claims, 7 Drawing Sheets

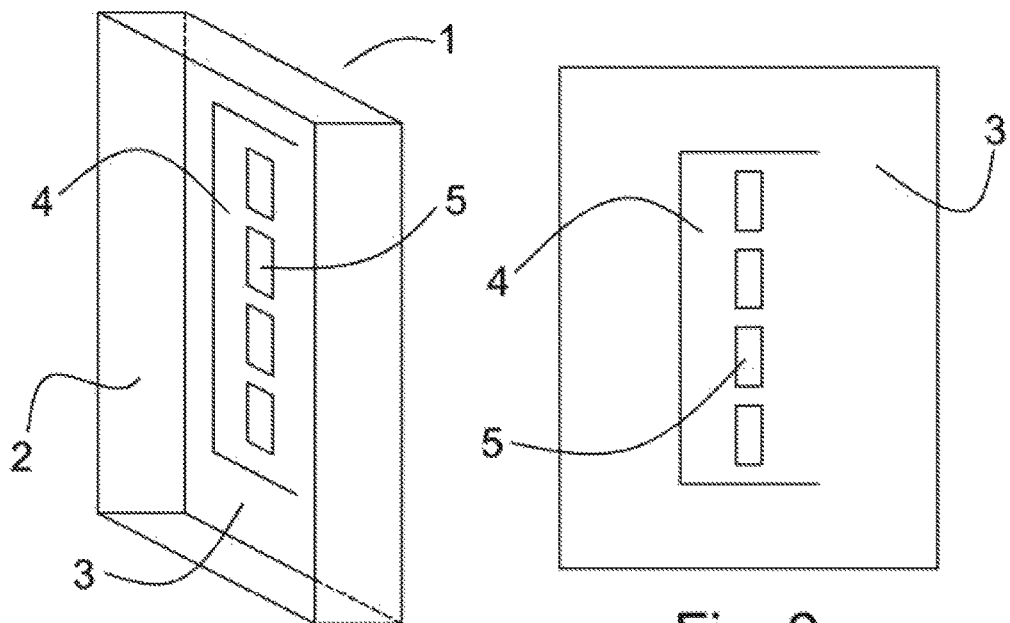
Fig. 1
Fig. 2
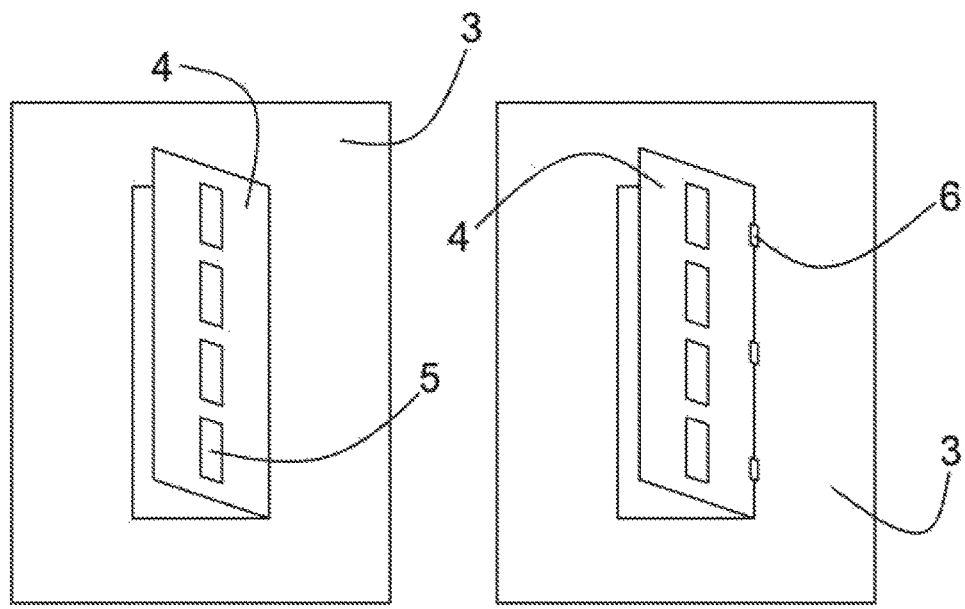
Fig. 2a
Fig. 2b

MOBILE PHONE / TABLET SHELL WITH FINGER GRASPING RING

CROSS REFERENCE TO RELATED PATENT APPLICATION

The present application is a continuation in part application of U.S. Ser. No. 15/014,832 filed on Feb. 3, 2016, and the present application claims the priority of U.S. 62/303,763 filed on Mar. 4, 2016, which application is incorporated herein by reference.

The application of U.S. Ser. No. 15/014,832 claims priorities of U.S. 62/112,204 filed Feb. 5, 2015, U.S. 62/182,514 filed Jun. 20, 2015, U.S. 62/274,313 filed Jan. 3, 2016, and U.S. 62/275,255 filed Jan. 6, 2016, which applications are incorporated herein by reference.

FIELD OF THE INVENTION

A mobile phone/tablet case with finger grasping ring, which belongs to the accessories of mobile phones and tablets.

BACKGROUND OF THE INVENTION

Now the scale of mobile phones and tablets grew and grew. While the big screen is easier to read, but the habit using the hand holding the mobile phone or tablet and the thumb of same hand operating touch-screen becomes increasingly difficult, sometimes even causes mobile phone or tablet falling to the ground to be damaged. Various existing mobile phone or tablet cases, they just have functions of protection or supporting the phone or tablet on the table, but cannot solve the above mentioned difficulty.

The purpose of the present invention is to provide a mobile phone/tablet case with finger grasping ring for solve the above mentioned difficulty, i.e. the new mobile phone/tablet case with finger grasping ring can help people using his hand and palm to hold phone or tablet and using the thumb of the same hand for operating the touch-screen easy and safely.

SUMMARY OF THE INVENTION

The purpose of present invention is realized by the following conceptions:

A mobile phone/tablet case with finger grasping ring comprises a box for receiving a body of the mobile phone or tablet, a finger grasping ring is provided on an outer surface of the box bottom, the finger grasping ring is provided a multiple of finger holes which are enterable by fingers, a turning connector connects the finger grasping ring with the outer surface of the box bottom, thereby the finger grasping ring is rotatable.

The mobile phone/tablet case with finger grasping ring of claim 2, wherein a short flexible wire connects a side of the finger grasping ring with the box bottom near the turning connector, thereby an opening of the finger grasping ring is restricted.

The box is an elastic material, the finger grasping ring itself is a part of the box bottom, a part of surround of the finger grasping ring is divided from the box bottom and other part is still connected, the turning connector is an elastic connecting portion between the finger grasping ring and the box.

The box is a rigid material, the turning connector is a hinge.

User by using his fingers which are inserted in the finger hole of the finger grasping ring and his palm can firmly hold the mobile phone or tablet, so that his thumb of the same hand is free to operate the touch screen.

Another embodiment of the mobile phone/tablet case with finger grasping ring comprises a box for receiving a body of the mobile phone or tablet, wherein a finger grasping ring provided on an bottom of the box; the finger grasping ring has a valve and the valve is resilient and has a an elastic belt; the valve has one side connected with the bottom together, other sides are separated from the bottom; the elastic belt has two opposite ends connected with the valve together and other two opposite sides separated from the valve, the elastic belt is parallel to long sides of the box.

Entering user's middle finger into the space between the belt and bottom the mobile phone or tablet can be firmly hold.

BRIEF DESCRIPTION OF THE DRAWINGS

FIG. 1 is a perspective view of the mobile phone/tablet case with finger grasping ring of the present invention.

FIG. 2 is a rear view of the mobile phone/tablet case with finger grasping ring shown in the FIG. 1, the finger grasping ring is in the middle of the box bottom.

FIG. 2a shows the finger grasping ring is turned outward.

FIG. 2b shows the finger grasping ring is connected with the box bottom by a hinge.

DETAIL DESCRIPTION OF THE INVENTION

Figure 3:
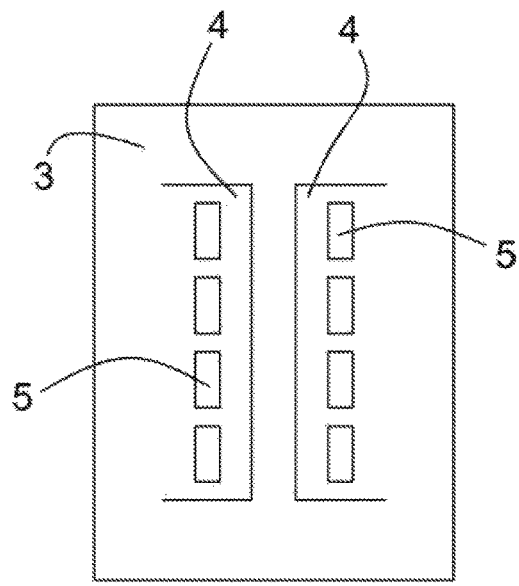
FIG. 3 shows the box bottom has two finger grasping rings, which are closed by turning to inward and are opened by turning to outward.

As shown in FIG. 1 the mobile phone/tablet case with finger grasping ring is composed by a box 1 and a finger grasping ring 4, the box 1 has box sides 2 and a box bottom 3. The mobile phone or tablet is placed in the box 1 and wrapped by the box sides 2.

As shown in FIG. 2, there is a finger grasping ring 4 on the box bottom 3. The finger grasping ring 4 is a rectangular part of the box bottom 3, three sides of the rectangular part are divided from the box bottom 3 by cutting, and the other side is still connected with the box bottom 3.

The finger grasping ring 4 may be in other shapes, such as oval or half-moon.

The box bottom 3 is an elastic material, so the finger grasping ring 4 can be turned open from or turned close to the box bottom 3. The finger grasping ring 4 has a plurality of finger holes 5, which may be square, rectangular, circular, or semicircular, the number of the finger holes 5 may be one, two, three or four.

As shown by FIG. 2a, the finger grasping ring 4 has been turned open.

As shown by FIG. 2b the finger grasping ring 4 is connected with the box bottom 3 by a hinge 6. The finger grasping ring 4 is turned open, it also can be turned close.

As shown by FIG. 3, there are two finger grasping rings 4 on the box bottom 3, the two finger grasping rings 4 are closed by turning to inward and are opened by turning to outward.

Figure 3A:
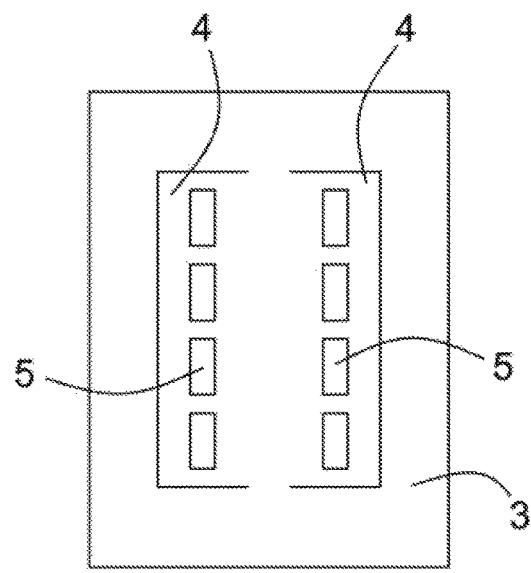
FIG. 3a shows the box bottom has two finger grasping ring, which are opened by turning to inward and are closed by turning to outward.

As shown by FIG. 3a, there are two finger grasping rings 4 on the box bottom 3, the two finger grasping rings 4 are opened by turning to inward and are closed by turning to outward.

Figure 4:
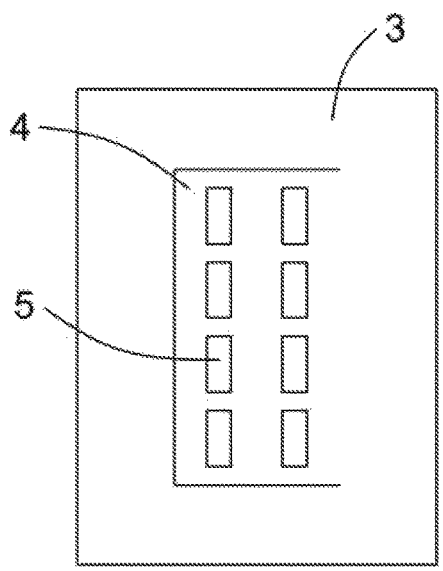
FIG. 4 shows the box bottom has a finger grasping ring, there are two parallel rows of finger holes on the finger grasping ring.

As shown by FIG. 4, there are one finger grasping rings 4 on the box bottom 3, the multiple of finger holes 5 are arranged as two parallel rows.

Figure 5:
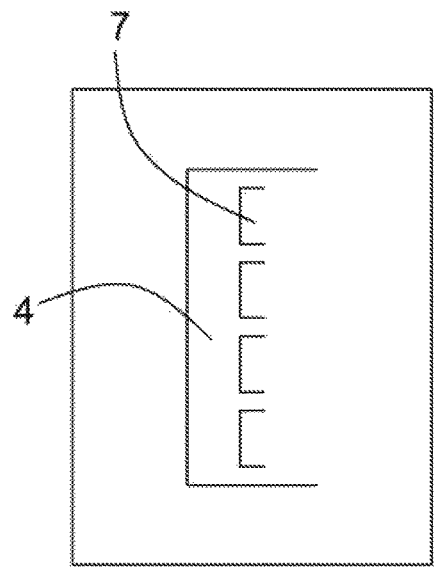
FIG. 5 shows the finger hole on the finger grasping ring has a valve, which can be opened or closed.
Figure 5A:
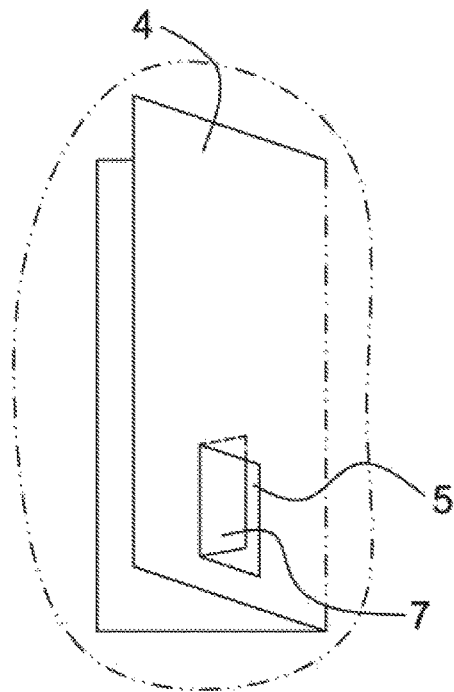
FIG. 5a shows the finger grasping ring shown in FIG. 5 is turned open, and the valve of the hole is turned open too.

As shown in FIGS. 5 and 5a the finger hole 5 of the finger grasping ring 4 has an elastic valve 7, the valve 7 can be opened or closed.

Figure 6:
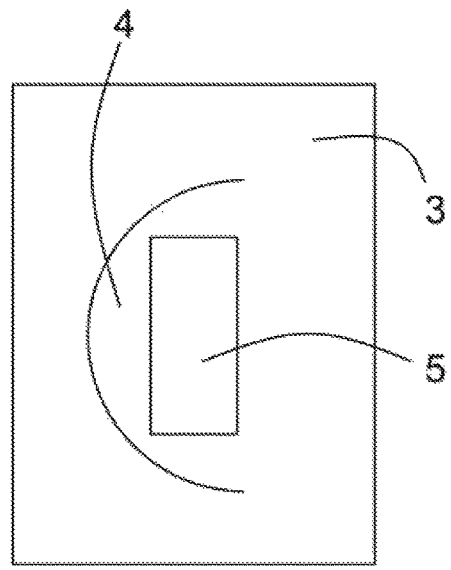
FIGS. 6, 6a and 6b show the finger grasping ring has various shapes and the valve of the finger hole has various shapes.
Figure 6A:
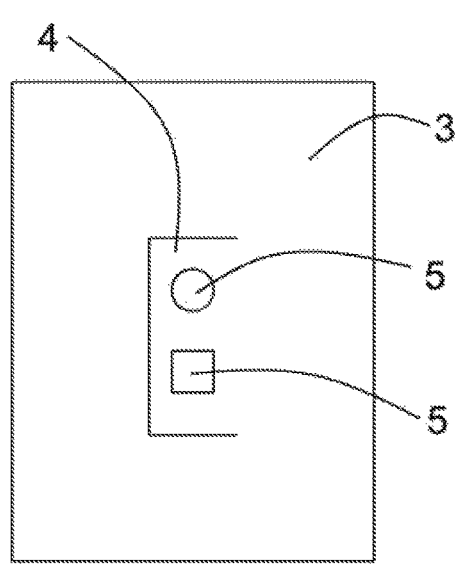
Figure 6B:
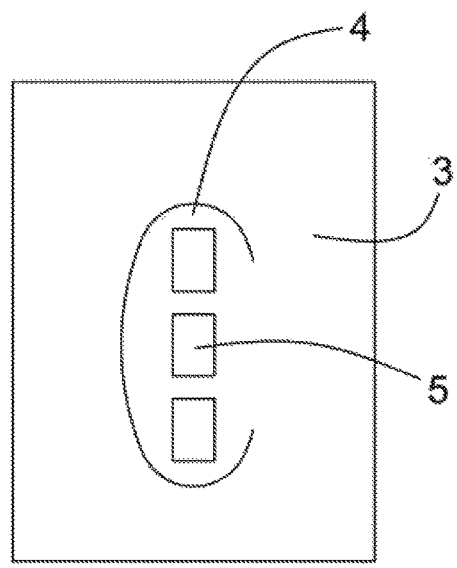

As shown by FIGS. 6, 6a and 6b, the finger grasping ring 4 has a rectangular shape, semi-circular, or elliptical shape, the finger holes 5 of the finger grasping ring 4 are rectangular, round, or square.

Figure 7:
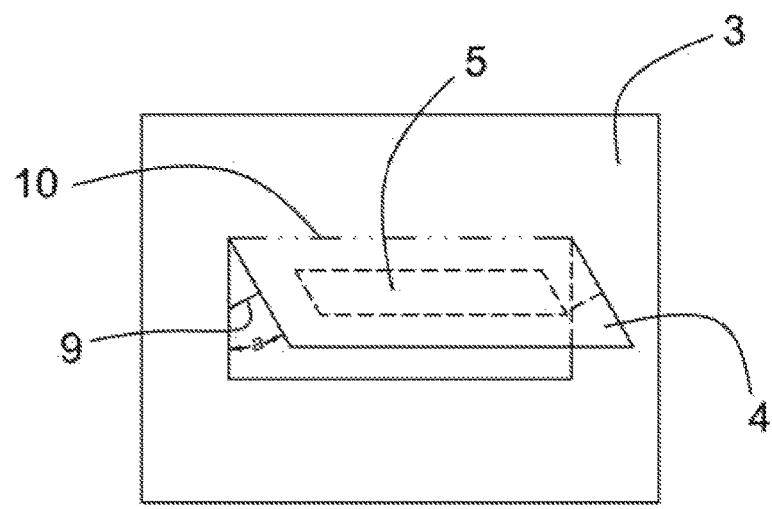
FIGS. 7 and 7a show a flexible wire connecting a side of the finger grasping ring with the box bottom, thereby the opening of the finger grasping ring is restricted.

As shown by FIG. 7, a short flexible wire 9 connects a side of the finger grasping ring 4 with the box bottom 3 near the turning connector 10, thereby an opening a of the finger grasping ring 4 is restricted. There is one finger hole 5 or no finger hole 5 on the finger grasping ring 4. As the opening of the opening a of the finger grasping ring 4 is restricted, the mobile phone/tablet case with finger grasping ring can support the mobile phone or tablet to stand on the desk, also the user can use his fingers and palm to grasp the mobile phone or tablet firmly, the thumb of the same hand can be free to operate the touch-screen.

Figure 7A:
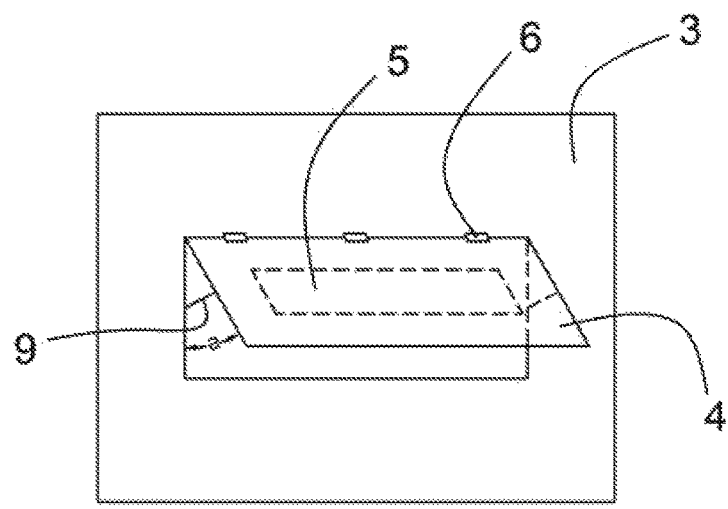

As shown by FIG. 7a, a short flexible wire 9 connects a side of the finger grasping ring 4 with the box bottom 3 near the hinge 6, thereby an opening a of the finger grasping ring 4 is restricted. There is one finger hole 5 or no finger hole 5 on the finger grasping ring 4. As the opening of the opening a of the finger grasping ring 4 is restricted, the mobile phone/tablet case with finger grasping ring can support the mobile phone or tablet to stand on the desk, also the user can use his fingers and palm to grasp the mobile phone or tablet firmly, the thumb of the same hand can be free to operate the touch-screen.

Figure 8:
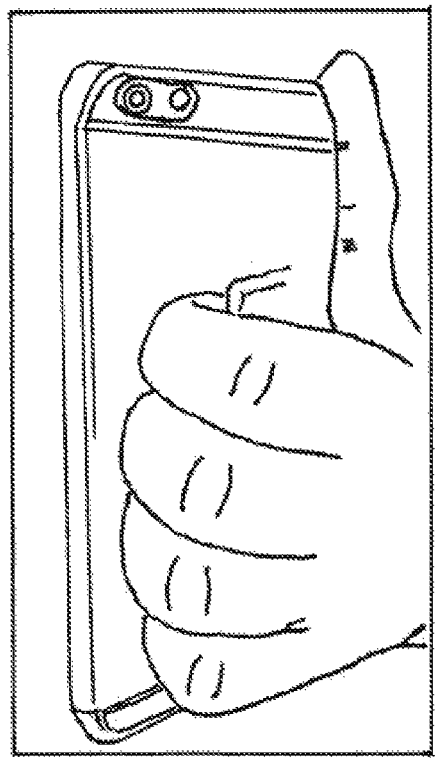
FIGS. 8 and 8a show the usage of the mobile phone/tablet case with finger grasping ring.
Figure 8A:
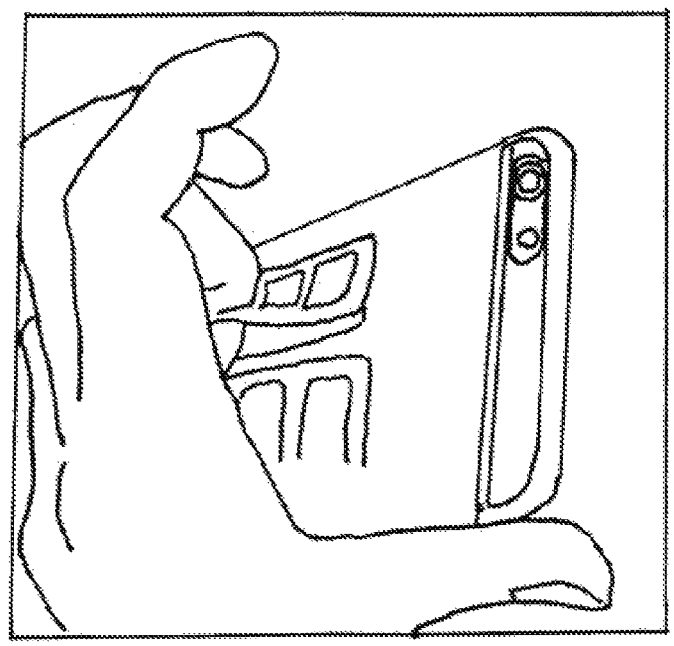

The FIGS. 8 and 8a, show the usage of the mobile phone/tablet case with finger grasping ring. User uses his fingers and palm to grasp the mobile phone or tablet firmly, the thumb of the same hand can be free to operate the touch-screen.

Because of the valves 7 of the finger holes 5 can be closed, so that the mobile phone or tablet can be better protected and will not be scratched.

Figure 9:
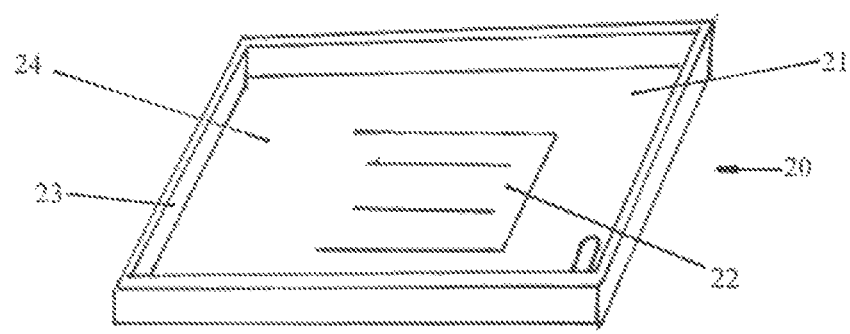
FIG. 9 shows a new mobile phone/tablet case with finger grasping ring of the present invention, the case has a box and box sides.

As shown by the FIG. 9, the mobile phone/tablet case with finger grasping ring 20 is composed by a box 21 and a finger grasping ring 22, the box 21 has box sides 23 and a box bottom 24. The mobile phone or tablet is placed in the box 21 and wrapped by the box sides 23.

Figure 9A:
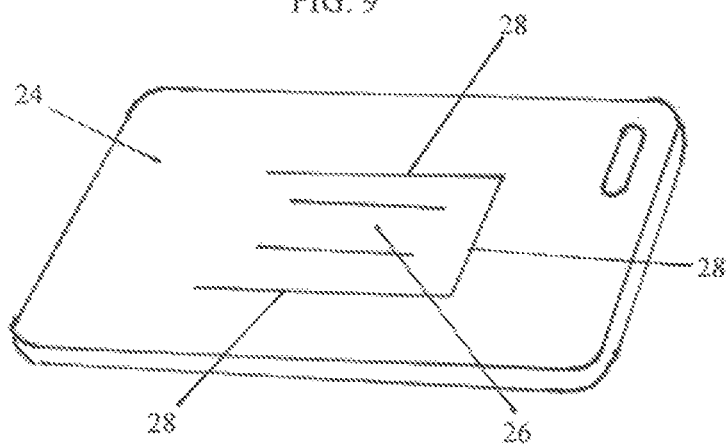
FIG. 9a shows that the bottom of the FIG. 9.

As shown in FIG. 9a, there is a finger grasping ring 22 on the box bottom 24.

Figure 9B:
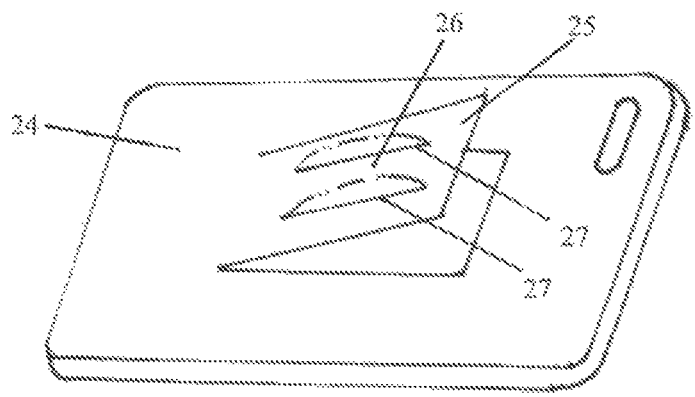
FIG. 9b shows that a finger grasping ring of the FIG. 9

As shown in FIG. 9b, the finger grasping ring 22 has an elastic valve 25 and an elastic belt 26.

The elastic valve 25 is configured by that two long sides and one short side of the elastic valve 25 are separated from the bottom 24 of the box 21 by three slits 28 respectively, another short side is connected with the bottom 24 together.

The elastic belt 26 is configured by that two long sides of the belt 26 are separated from the elastic valve by two slits 27 respectively, two short sides is connected with the elastic valve 25 together. The elastic belt is parallel to long sides of the box. The elastic belt 26 can be pulled out (shown as dotted line in FIG. 9b) to form a gap for a middle finger entering the gap to grasp the case containing a mobile phone/tablet.

Figure 9C:
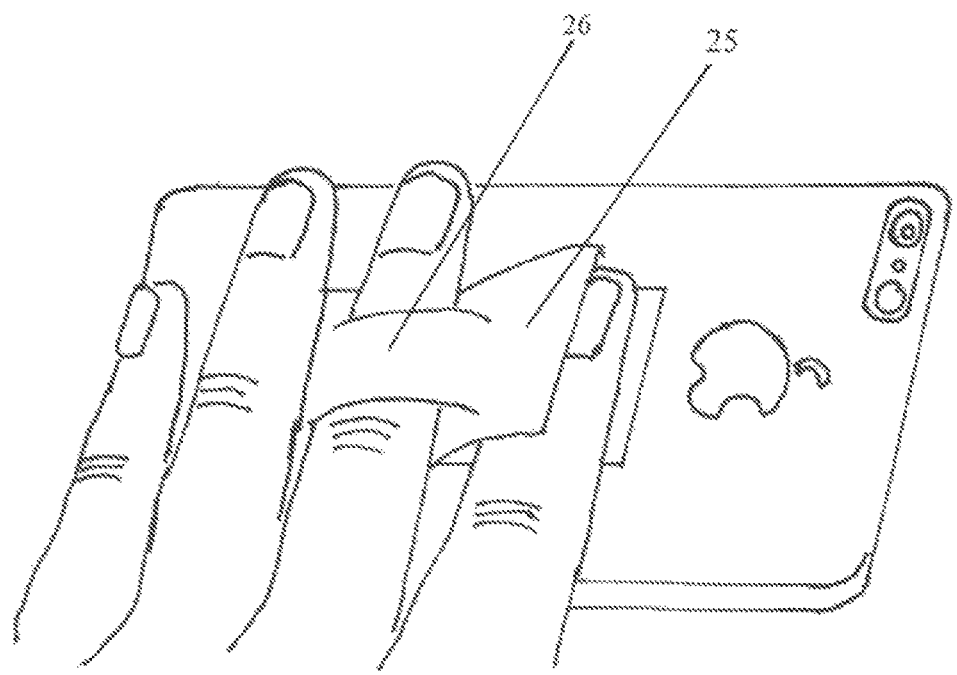
FIG. 9c shows using status of the new mobile phone/tablet case of the FIG. 9

As shown in FIG. 9c, the middle finger of user enters the gap between the belt and valve, the case containing a mobile phone/tablet is grasped without thumb.

What is claimed is:

1. A mobile phone/tablet case with finger grasping rings comprising:
    a rectangular box for receiving a body of a mobile phone or tablet, wherein a box bottom of the rectangular box is an elastic material;
    two rectangular finger grasping rings provided on the box bottom, each finger grasping ring itself is divided by cutting from the box bottom and has a connected long side and three separated sides with the box bottom, wherein the two finger grasping rings are parallel to long sides of the rectangular box;
    each finger grasping ring is provided with a multiple of finger holes, wherein each finger hole has a resilient finger valve, and
    a short flexible wire connects a side of the finger grasping ring with the box bottom near a turning connector, thereby restricting an opening of the finger grasping ring.

2. A mobile phone/tablet case with finger grasping rings comprising:
    a rectangular box for receiving a body of a mobile phone or tablet, wherein a box bottom of the rectangular box is an elastic material;
    an elastic rectangular finger grasping ring provided on the box bottom, the elastic rectangular finger grasping ring is configured such that it itself is divided by cutting from the box bottom, and
    two long sides and one short side of the elastic rectangular finger grasping ring are separated from the box bottom by three slits respectively, and another one short side is connected with the box bottom;
    the elastic rectangular finger grasping ring has an elastic belt;
    the elastic belt is configured by two long sides that are separated from the elastic rectangular finger grasping ring by two slits and two short sides that are connected with the elastic rectangular finger grasping ring, wherein the elastic belt is parallel to long sides of the box.

* * * * *